United States Patent
Yanagidate

(10) Patent No.: US 9,332,233 B2
(45) Date of Patent: May 3, 2016

(54) IMAGE PROCESSING DEVICE FOR PROCESSING A PLURALITY OF DATA FORMATS CORRESPONDING TO DIFFERENT IMAGE QUALITIES

(71) Applicant: OLYMPUS CORPORATION, Tokyo (JP)

(72) Inventor: Masaharu Yanagidate, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 244 days.

(21) Appl. No.: 14/017,371

(22) Filed: Sep. 4, 2013

(65) Prior Publication Data

US 2014/0002625 A1 Jan. 2, 2014

Related U.S. Application Data

(63) Continuation of application No. PCT/JP2012/055379, filed on Mar. 2, 2012.

(30) Foreign Application Priority Data

Mar. 25, 2011 (JP) ................................. 2011-067760

(51) Int. Cl.
*H04N 5/232* (2006.01)
*H04N 7/18* (2006.01)
(Continued)

(52) U.S. Cl.
CPC ........... *H04N 7/183* (2013.01); *H04N 1/33307* (2013.01); *H04N 1/33361* (2013.01);
(Continued)

(58) Field of Classification Search
CPC ... H04N 5/232; H04N 5/225; H04N 5/23206; H04N 5/23293; H04N 2005/2255; H04N 7/12; H04N 7/14
See application file for complete search history.

(56) References Cited

U.S. PATENT DOCUMENTS 7,002,992 B1 * 2/2006 Shaffer ............... H04M 7/0072
370/252
2001/0019365 A1 * 9/2001 Kim ..................... H04N 5/4401
348/554
(Continued)

FOREIGN PATENT DOCUMENTS

JP 2003-069472 A 3/2003
JP 2004-064300 A 2/2004
(Continued)

OTHER PUBLICATIONS

International Search Report for PCT/JP2012/055379, Mailing Date of Jun. 12, 2012.
(Continued)

*Primary Examiner* — Roberto Velez
*Assistant Examiner* — Abdelaaziz Tissire
(74) *Attorney, Agent, or Firm* — Thomas E. Brown

(57) ABSTRACT

Provided is an image processing device which includes a storage unit and a selection unit. The storage unit stores a plurality of data formats corresponding to different image qualities, as data formats specifying at least two elements from among resolution, color expression, update cycle, and gradation which are elements relating to the image quality of an image displayed by a display device which continuously subjects frame image data to display processing and displays images. Furthermore, the storage unit stores importance information indicating the importance of an element. If a detection unit detects that the communication environment has degraded, the selection unit selects, for an element selected based on the importance information stored in the storage unit, a data format having a lower quality specified format than the format specified by the data format currently selected.

6 Claims, 6 Drawing Sheets

| FORMAT NUMBER | IMAGE QUALITY ELEMENT (A,B,C,D) | CONTENT (RESOLUTION, COLOR REPRESENTATION, UPDATE PERIOD, GRADATION) |
|---|---|---|
| 1111 | (1,1,1,1) | 1920×1440, (444), 60Hz, 12bit |
| 1112 | (1,1,1,2) | 1920×1440, (444), 60Hz, 10bit |
| 1113 | (1,1,1,3) | 1920×1440, (444), 60Hz, 8bit |
| 1114 | (1,1,1,4) | 1920×1440, (444), 60Hz, 6bit |
| 1121 | (1,1,2,1) | 1920×1440, (444), 30Hz, 12bit |
| 1122 | (1,1,2,2) | 1920×1440, (444), 30Hz, 10bit |
| ⋮ | ⋮ | ⋮ |
| 5443 | (5,4,4,3) | 640×480, (400), 7.5Hz, 8bit |
| 5444 | (5,4,4,4) | 640×480, (400), 7.5Hz, 6bit |

| DEVICE ID | USER ID | IMAGING DATA FORMAT | ALLOWED LOWEST IMAGE QUALITY INFORMATION | IMPORTANT ELEMENT INFORMATION (ORDER-RATIO) |
|---|---|---|---|---|
| ES02 | 0000 | 1212 | 4324 | 1342, 1111 |
| | D001 | 1212 | 4324 | 1234, 1122 |
| | T003 | 1212 | 4324 | 1432, 1222 |
| IS01 | 0000 | 1211 | 4324 | 2314, 1111 |
| 0000 | 0000 | 0000 | 5444 | 1342, 1111 |

(51) Int. Cl.
*H04N 1/333* (2006.01)
*H04N 9/79* (2006.01)
*H04N 5/77* (2006.01)
*H04W 4/18* (2009.01)

(52) U.S. Cl.
CPC ........... *H04N5/232* (2013.01); *H04N 5/23206* (2013.01); *H04N 5/23293* (2013.01); *H04N 5/772* (2013.01); *H04N 9/7921* (2013.01); *H04N 2201/0086* (2013.01); *H04N 2201/33378* (2013.01); *H04W 4/18* (2013.01)

(56) References Cited

U.S. PATENT DOCUMENTS

| | | | |
|---|---|---|---|
| 2002/0018124 A1* | 2/2002 | Mottur | H04N 5/23203 348/211.99 |
| 2004/0086039 A1* | 5/2004 | Reynolds | H04L 29/06 375/240.01 |
| 2004/0090539 A1 | 5/2004 | Kim et al. | |
| 2005/0024486 A1* | 2/2005 | Ratnakar | H04N 19/172 348/14.13 |
| 2005/0134900 A1* | 6/2005 | Kuwata | H04N 1/3871 358/1.15 |
| 2005/0164679 A1* | 7/2005 | Beardow | H04N 1/333 455/412.1 |
| 2007/0126875 A1* | 6/2007 | Miyamaki | G08B 13/19656 348/207.11 |
| 2008/0139881 A1* | 6/2008 | Cover | A61B 1/00016 600/103 |
| 2009/0197526 A1 | 8/2009 | Yonemoto | |
| 2009/0219441 A1* | 9/2009 | Kurita | G06F 3/1431 348/571 |
| 2010/0124271 A1* | 5/2010 | Martz | H04N 7/17336 375/240.01 |
| 2012/0082390 A1* | 4/2012 | Kawasaki | A61B 1/00016 382/232 |
| 2012/0218430 A1* | 8/2012 | Yanagidate | H04N 21/2187 348/211.2 |
| 2013/0271621 A1* | 10/2013 | Lee | H04N 5/232 348/222.1 |
| 2013/0342719 A1* | 12/2013 | Tashiro | H04N 7/0127 348/222.1 |
| 2013/0342761 A1* | 12/2013 | Wada | H04N 5/38 348/571 |
| 2014/0015946 A1* | 1/2014 | Yanagidate | A61B 5/7445 348/65 |
| 2014/0063284 A1* | 3/2014 | Yanagidate | H04N 7/185 348/223.1 |
| 2015/0271493 A1* | 9/2015 | Okazaki | H04N 5/23206 348/211.11 |

FOREIGN PATENT DOCUMENTS

| | | |
|---|---|---|
| JP | 2004-320614 A | 11/2004 |
| JP | 2005-117236 A | 4/2005 |
| JP | 2009-081753 A | 4/2009 |
| WO | 2008/063565 A2 | 5/2008 |
| WO | 2010/059179 A1 | 5/2010 |

OTHER PUBLICATIONS

Extended European Search Report dated Jul. 16, 2014, issued in European Patent Application No. 12764852.5 (9 pages).

Xie X. et al., "A Low-Power Digital IC Design Inside the Wireless Endoscopic Capsule", IEEE Journal of Solid-State Circuits, vol. 41, No. 11, Nov. 2006, pp. 2390-2400, cited in Extended European Search Report dated Jul. 16, 2014.

Naegele-Jackson S et al., "Influence of Compression and Network Impairments on the Picture Quality of Video Transmissions in Tele-Medicine", Proceedings of the 35th Hawaii International Conference on System Sciences, (2002), (9 pages), Cited in Extended European Search Report dated Jul. 16, 2014.

Office Action dated Jun. 2, 2015, issued in counterpart Japanese application No. 2011-067760, with English translation (4 pages).

\* cited by examiner

FIG. 3

|  | | IMAGE QUALITY ELEMENT | | | |
|---|---|---|---|---|---|
|  | | A:RESOLUTION | B:COLOR REPRESENTATION | C:UPDATE PERIOD | D:GRADATION |
| IMAGE QUALITY RANK | 1 | 1920×1440 | YUV(4,4,4) | 60Hz | 12bit |
| | 2 | 1280×960 | YUV(4,2,2) | 30Hz | 10bit |
| | 3 | 1024×768 | YUV(4,1,1) | 15Hz | 8bit |
| | 4 | 800×600 | YUV(4,0,0) | 7.5Hz | 6bit |
| | 5 | 640×480 | | | |

FIG. 4

| FORMAT NUMBER | IMAGE QUALITY ELEMENT(A,B,C,D) | CONTENT (RESOLUTION, COLOR REPRESENTATION, UPDATE PERIOD, GRADATION) |
|---|---|---|
| 1111 | (1,1,1,1) | 1920×1440, (444), 60Hz, 12bit |
| 1112 | (1,1,1,2) | 1920×1440, (444), 60Hz, 10bit |
| 1113 | (1,1,1,3) | 1920×1440, (444), 60Hz, 8bit |
| 1114 | (1,1,1,4) | 1920×1440, (444), 60Hz, 6bit |
| 1121 | (1,1,2,1) | 1920×1440, (444), 30Hz, 12bit |
| 1122 | (1,1,2,2) | 1920×1440, (444), 30Hz, 10bit |
| ⋮ | ⋮ | ⋮ |
| 5443 | (5,4,4,3) | 640×480, (400), 7.5Hz, 8bit |
| 5444 | (5,4,4,4) | 640×480, (400), 7.5Hz, 6bit |

FIG. 5

| DEVICE ID | USER ID | IMAGING DATA FORMAT | ALLOWED LOWEST IMAGE QUALITY INFORMATION | IMPORTANT ELEMENT INFORMATION (ORDER-RATIO) |
|---|---|---|---|---|
| ES02 | 0000 | 1212 | 4324 | 1342, 1111 |
| | D001 | 1212 | 4324 | 1234, 1122 |
| | T003 | 1212 | 4324 | 1432, 1222 |
| IS01 | 0000 | 1211 | 4324 | 2314, 1111 |
| 0000 | 0000 | 0000 | 5444 | 1342, 1111 |

FIG. 7

| SELECTION ORDER | FORMAT NUMBER |
|---|---|
| 1 | 1212 |
| 2 | 1213 |
| 3 | 1214 |
| 4 | 1224 |
| 5 | 1324 |
| 6 | 2324 |
| 7 | 3324 |
| 8 | 4324 |

IMAGE PROCESSING DEVICE FOR PROCESSING A PLURALITY OF DATA FORMATS CORRESPONDING TO DIFFERENT IMAGE QUALITIES

CROSS REFERENCE TO RELATED APPLICATIONS

This application is a continuation application based on a PCT Patent Application No. PCT/JP2012/055379, filed Mar. 2, 2012, whose priority is claimed on Japanese Patent Application No. 2011-067760, filed Mar. 25, 2011 the entire content of which are hereby incorporated by reference.

BACKGROUND OF THE INVENTION

1. Field of the Invention

The present invention relates to an image processing device that performs image processing on frame image data input from an imaging device.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

When image data is transmitted by using a wireless communication line, a communication environment may deteriorate due to electromagnetic noise and predetermined image data may not be transmitted. In order to cope with such a situation, for example, a system that switches a communication protocol according to the communication environment to keep discomfort of a user to a minimum is disclosed in Japanese Unexamined Patent Application, First Publication No. 2003-69472.

SUMMARY

The present invention provides an image processing device capable of suppressing deterioration of image quality of an element, which is highly important among elements related to image quality of an image displayed on a display device, even when a communication environment deteriorates.

An image processing device according to a first aspect of the present invention includes an input unit, a storage unit an image processing unit, a wireless communication unit, a detecting unit and a selection unit. Frame image data is input to the input unit from an imaging device that images a subject and continuously outputs the frame image data. The storage unit stores a plurality of data formats corresponding to different image qualities, the data formats defining a format of at least two elements among resolution, color representation, update period and gradation that are elements related to image quality of an image displayed on a display unit continuously performing display processing on the frame image data and displaying the image. Further, the storage unit stores importance degree information indicating an importance degree of the element. The image processing unit performs image processing on the frame image data input to the input unit according to the data format selected from the data formats stored in the storage unit. The wireless communication unit continuously and wirelessly transmits the frame image data subjected to the image processing by the image processing unit to the display unit. The detecting unit detects a wireless communication environment when the wireless communication unit wirelessly transmits the frame image data. The selection unit selects one of the data formats stored in the storage unit. Further, the selection unit selects the data format defining a format lower in quality than a format defined in a currently selected data format for the element selected based on the importance degree information stored in the storage unit when deterioration of the communication environment is detected by the detection unit.

Further, according to a second aspect of the present invention, the selection unit performs selection for the element whose importance degree is indicated to be lower than those of the other elements by the importance degree information when deterioration of the communication environment is detected by the detection unit. Further, the selection unit selects the data format defining a format lower in quality than the format defined in the currently selected data format.

Further, according to a third aspect of the present invention, the storage unit stores the data format for each user, each imaging device, or each combination of the user and the imaging device.

Further, according to a fourth aspect of the present invention, the storage unit stores a plurality of first data formats, and a second data format corresponding to image quality of a highest quality for each imaging device. The selection unit performs selection based on the importance degree information stored in the storage unit when deterioration of the communication environment is detected by the detection unit. Further, the selection unit defines a format less than or equal to, in terms of quality, a format defined in the second data format corresponding to the imaging device outputting the frame image data input to the input unit for the element selected based on the importance degree information. Further, the selection unit selects the first data format, the first data format defining a format lower in quality than the format defined in the currently selected data format.

Further, according to a fifth aspect of the present invention, the storage unit stores a plurality of first data formats, and a second data format defining a format corresponding to image quality of a lowest available quality of each of the at least two elements. The selection unit performs selection based on the importance degree information stored in the storage unit when deterioration of the communication environment is detected by the detection unit. Further, the selection unit selects the first data format defining a format higher in quality than or equal in quality to a format defined in the second data format for the element selected based on the importance degree information, the first data format defining a format lower in quality than the format defined in the currently selected data format.

Further, according to a sixth aspect of the present invention, the storage unit stores the second data format for each user, each imaging device, or each combination of the user and the imaging device.

BRIEF DESCRIPTION OF THE DRAWINGS

The above features and advantages of the present invention will be more apparent from the following description of certain preferred embodiments taken in conjunction with the accompanying drawings, in which:

FIG. 3 is a reference diagram illustrating a format selection table in accordance with a preferred embodiment of the present invention;

FIG. 4 is a reference diagram illustrating a format table in accordance with a preferred embodiment of the present invention;

FIG. 5 is a reference diagram illustrating format selection control information in accordance with a preferred embodiment of the present invention;

FIG. 7 is a reference diagram illustrating a format selection order table in accordance with a preferred embodiment of the present invention.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
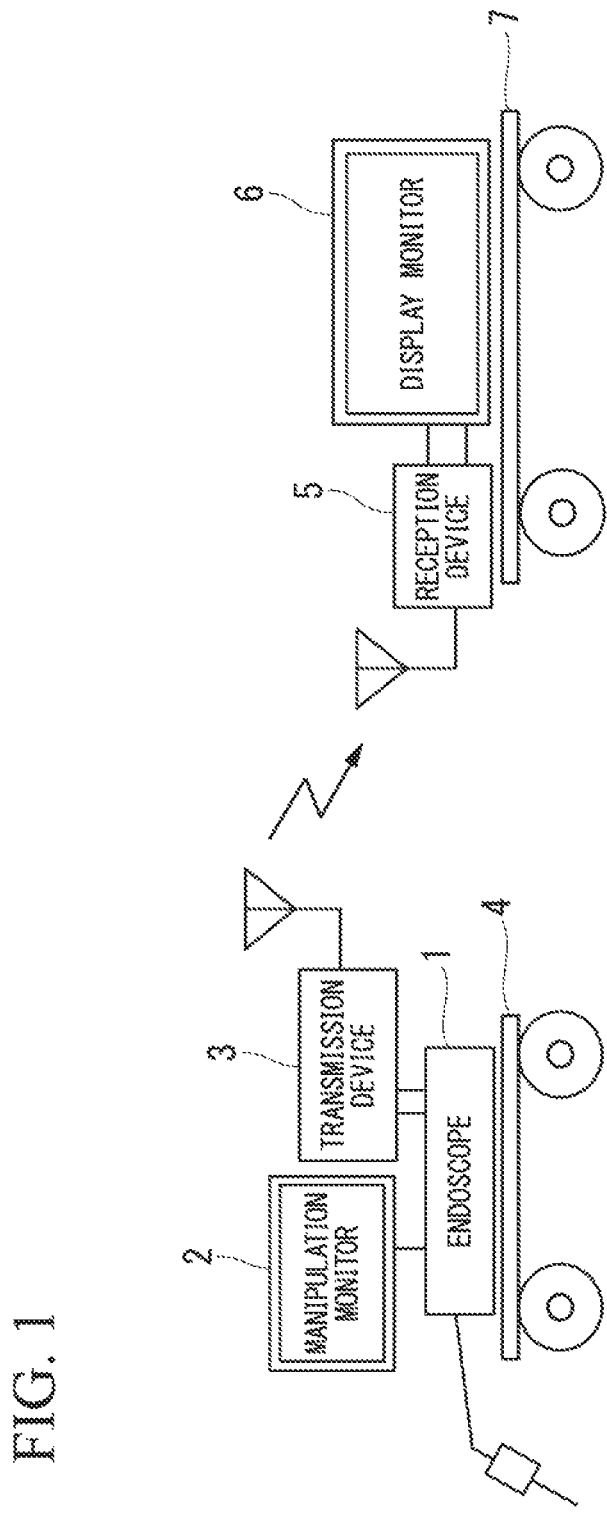
FIG. 1 is a block diagram illustrating a configuration of an imaging display system in accordance with a preferred embodiment of the present invention.

Hereinafter, preferred embodiments of the present invention will be described with reference to the drawings. Hereinafter, a case in which a preferred embodiment of the present invention is applied to an imaging display system including an endoscope, a transmission device, a reception device, and a display monitor will be described by way of example. FIG. 1 shows a configuration of an imaging display system in accordance with a preferred embodiment of the present invention. In FIG. 1, an endoscope 1, a manipulation monitor 2 that displays an endoscope image generated by the endoscope 1 or various control screens, and a transmission device 3 that performs wireless transmission of image data are mounted on a cart 4. A reception device 5 that receives the image data transmitted from the transmission device 3 and outputs the image data as a video signal, and a display monitor 6 that displays the video signal output from the reception device 5 as an image are mounted on a cart 7.

The endoscope 1 continuously generates image data (frame image data) of each frame of moving image data including a plurality of frames. The image data generated by the endoscope 1 is wirelessly transmitted from the transmission device 3 to the reception device 5, and an image is displayed on the display monitor 6 connected to the reception device 5. The transmission device 3 converts a format of the image data output from the endoscope 1 to a data amount format according to a communication situation, packetizes data after the conversion, and wirelessly transmits a packet. Further, the reception device 5 extracts the image data from the received packet. Further, the reception device 5 performs format conversion and image processing on the extracted image data to generate the video signal, and outputs the video signal to the display monitor 6. The display monitor 6 performs display processing on the video signal and displays the image.

Figure 2:
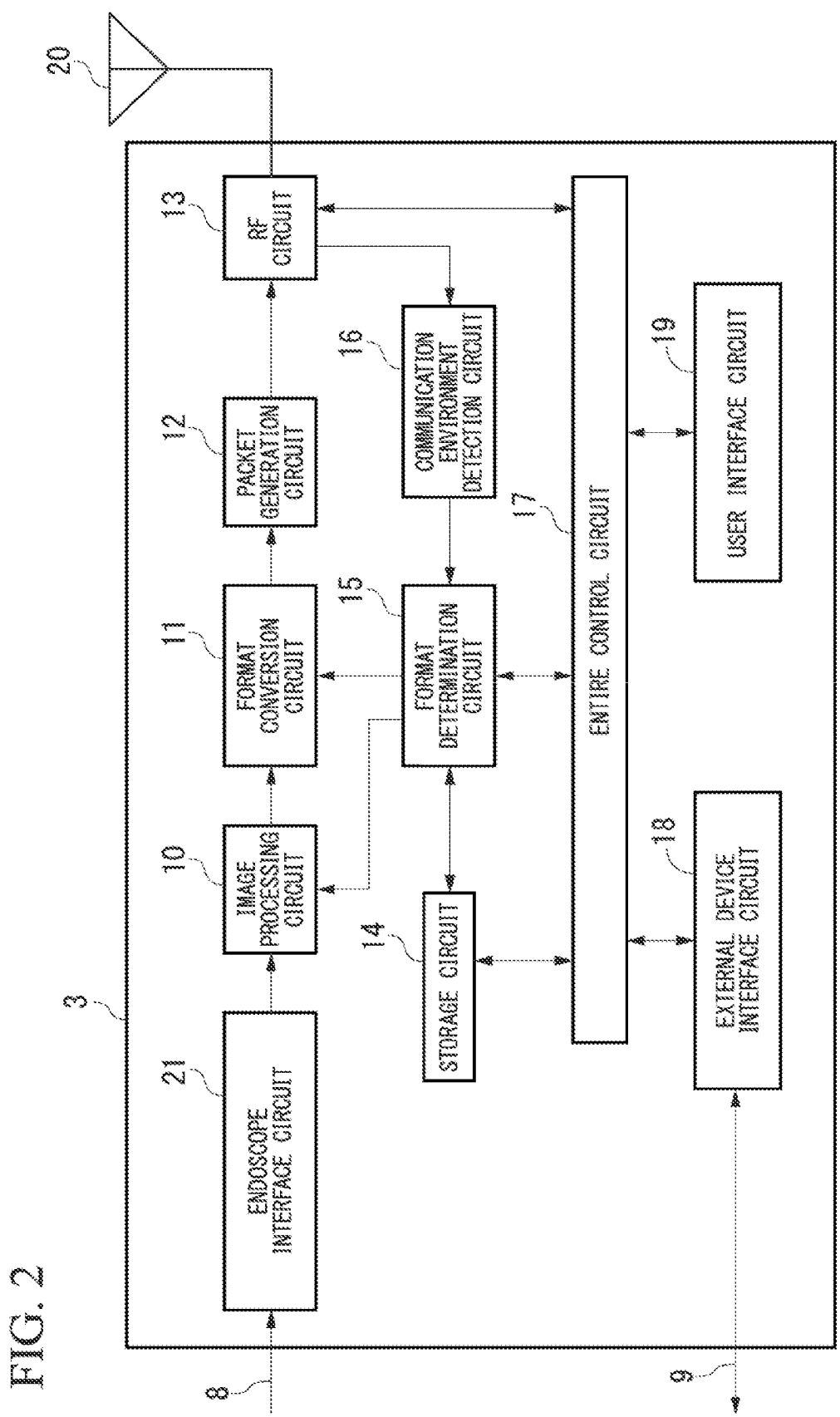
FIG 2 is a block diagram illustrating a configuration of a transmission device included in the imaging display system in accordance with a preferred embodiment of the present invention.

FIG. 2 illustrates a configuration of the transmission device 3. The transmission device 3 includes an image processing circuit 10, a format conversion circuit 11, a packet generation circuit 12, an RF circuit 13, a storage circuit 14, a format determination circuit 15, a communication environment detection circuit 16, an entire control circuit 17, an external device interface circuit 18, a user interface circuit 19, an antenna 20, and an endoscope interface circuit 21.

An imaging signal 8 constituting the image data and an endoscope control signal 9 are input from the endoscope 1 to the transmission device 3. The imaging signal 8 from the endoscope 1 is input to the endoscope interface circuit 21 and is output to the image processing circuit 10. The image processing circuit 10 performs image processing corresponding to a predetermined format on the imaging signal and outputs an imaging signal after the image processing to the format conversion circuit 11. The format conversion circuit 11 converts a format of the imaging signal output from the image processing circuit 10 to a predetermined format and outputs the imaging signal after the conversion to the packet generation circuit 12. The packet generation circuit 12 packetizes the imaging signal output from the format conversion circuit 11 and outputs a packet to the RF circuit 13. The RF circuit 13 converts the packet output from the packet generation circuit 12 to a radio packet, and transmits the packet via an antenna 20.

The image processing performed by the image processing circuit 10 is, for example, processing for performing a filtering process on data of 1920(H)×1440(V) to generate data of 800(H)×600(V) in which distortion of the image has been removed when a format at the time of wireless transmission corresponding to a case in which resolution of the imaging signal 8 is 1920(H)×1440(V) is 800(H)×600(V). Such processing is well known as preprocessing associated with format conversion. Therefore, further description is omitted.

In the present preferred embodiment, when a wireless communication environment (hereinafter described as a communication environment) deteriorates and a data amount that can be transmitted is reduced, communication is performed using a format in which transmission is possible even with a data amount after the reduction. An operation of format selection when a wireless environment deteriorates will be described below.

A state of a wireless environment is recognized by a communication situation in the RF circuit 13. Specifically, the RF circuit 13 notifies the communication environment detection circuit 16 of a packet retransmission situation in wireless communication. The communication environment detection circuit 16 detects a change in the communication environment according to the packet retransmission situation and calculates a data amount that can be communicated.

For example, when the communication situation is good, a wireless communication scheme capable of transmitting 200 packets in a period of 1/60 of a second (about 16.7 ms) is assumed to be used. A current generation rate of retransmission packets in this wireless communication scheme is 5% on average. When transmission is to be performed with such a margin that the number of retransmission packet generations is allowed to be twice the current number, image data in a format in which 180 packets (200×0.9=180) are used for one screen can be transmitted every 1/60 of a second. The average retransmission packet number in this case is 10.

When the communication environment deteriorates and the retransmission of 20 packets is performed in a period of 1/60 of a second (about 16.7 ms), there is no margin in a communication path. Since the data transmission for one screen frequently stops on the way when there is no margin in the communication path, it is necessary to give the margin in the communication path. In the present preferred embodiment, the transmission is performed with such a margin that the number of retransmission packet generations is allowed to be twice the current number.

For example, in the case of the above example, it is determined that there has been no margin in the communication path at a time point at which the average retransmission packet number exceeds 10. In this case, a format is changed to reduce the number of packets necessary for transmission of one screen. For example, in the case of the above example, when the data for one screen is assumed to be transmitted by 100 packets as a result of changing the format, the deterioration of the communication environment progresses. As a result, a next format change is performed at a time point at which the average retransmission packet number is 50. On the other hand, when the communication environment is improved and the average retransmission packet number is changed to a current format the communication environment is determined to have been improved at a time point at which the average retransmission packet number is 5, which is half of 10, determination criterion. As a result, the format change is performed to return to an original format.

The communication environment detection circuit 16 measures a situation of the communication path using the method described above, and notifies the format determination circuit 15 of the change in the communication environment when the change in the communication path continues for a predetermined time or more. When the change in the communication environment is notified of from the communication environment detection circuit 16, the format determination circuit 15 determines a format to be used using various pieces of information stored in the storage circuit 14. Information of the format determined by the format determination circuit 15 is output to the image processing circuit 10 and the format conversion circuit 11. Furthermore, the information of the format determined by the format determination circuit 15 is reflected on processes in the image processing circuit 10 and the format conversion circuit 11.

The memory circuit 14 stores a format table, a format selection table, format selection control information, a format selection order table and the like, which will be described below. The external device interface circuit 18 is connected to the endoscope 1 through the endoscope control signal 9. The external device interface circuit 18 acquires device ID information for identifying the endoscope 1 from the endoscope 1 and notifies the format determination circuit 15 of the device ID information via the entire control circuit 17. The user interface circuit 19 receives various pieces of information input by the user. The user interface circuit 19 is stored in the storage circuit 14 via the entire control circuit 17. The entire control circuit 17 is a circuit that controls the entire operation of the transmission device 3.

FIG. 3 is an example of the format selection table in the present preferred embodiment. In the format selection table, formats of image quality elements that can be selected in the present preferred embodiment are classified according to an image quality rank.

In the present preferred embodiment, the image quality elements determining the image quality of the display image include resolution (A), color representation (B). update period (C), and gradation (D). For each image quality element, the format is defined for each image quality rank.

For example, in the resolution (A), a format corresponding to a case in which the image quality rank is 1 (highest image quality) is 1920(H)×1440(V), and a format corresponding to a case of a next image quality rank is 1280(H)×960(V). A ratio of a data amount between the two formats is 2.25 ([1920×1440]/[1280×960]=2.2S), Hereinafter, the formats of the resolution as shown are selectable.

The color representation (B) indicates a general YC format. For example, a format corresponding to the case in which the image quality rank is 1 (highest image quality) is YUV (4,4,4), and is a format in which a ratio of Y (luminance) and U and V (color) is 1:1:1. A format corresponding to the case of the next image quality rank is YUV(4,2,2) and is a format in which the ratio of Y (luminance) and U and V (color) is 1:0.5:0.5. A ratio of a data amount between the two formats is 1.5 ([1+1+1]/[1+0.5+0.5]=1.5). Hereinafter, the YC formats as shown are selectable.

The update period (C) indicates a format of a frame rate. For example, a format corresponding to the case in which the image quality rank is 1 (highest image quality) is 60 frames/second, and a format corresponding to the case of the next image quality rank is 30 frames/second. A ratio of a data amount between the two formats is 2 (60/30=2). The formats of the frame rate as shown are selectable.

The gradation (D) indicates a format of a bit length of a pixel For example, a format corresponding to the case in which the image quality rank is 1 (highest image quality) is 12 bits in length, and a format corresponding to the case of a next image quality rank is 10 bits in length. A ratio of a data amount between the two formats is 1.2 (12/10=1.2), The formats of the gradation as shown are selectable.

FIG. 4 is an example of the format table in the present preferred embodiment. The format table of FIG. 4 indicates a data format that is a combination of formats of the respective image quality elements shown in FIG. 3. A format number corresponding to the image quality rank of the image quality element shown in FIG. 3 is attached, as shown in FIG. 4. For example, format number=1111 indicates that the image quality rank of A: resolution of the corresponding image quality element is 1, the image quality rank of B: color representation is 1, the image quality rank of C: update period is 1, and the image quality rank of D: gradation is 1. In this case, the format in which the image quality rank of A: resolution is 1 is 1,920× 1,440. The format in which the image quality rank of B: color representation is 1 is YUV(4,4,4). The format in which the image quality rank of C: update period is 1 is 60 Hz. The format in which the image quality rank of D: gradation is 1 is 12 bits.

The data format selected by the format determination circuit 15 is expressed using the format number of the format table of FIG 4. In the present preferred embodiment each of four numbers constituting the format number defines a format of the four image quality elements. All the format numbers indicate the data formats as a set of formats of the lour image quality elements.

FIG. 5 is a structure example of the format selection control information in the present preferred embodiment. The format selection control information is information referenced by the format determination circuit 15 when the format determination circuit 15 determines the format. The format selection control information is information indicating a data format of highest image quality according to performance of the imaging device, a data format of lowest image quality specified by each user, and importance (importance degree) of each image quality element specified by each user. As shown, the format selection control information includes a device ID, a user ID, an imaging data format, allowed lowest image quality information, and important element information.

The number of the imaging data format, the allowed lowest image quality information and the important element information corresponds to the format number of FIG. 4. Further information is arranged in order of the image quality element shown in the format table of FIG. 4 in the imaging data format, the allowed lowest image quality information and the important element information. The device ID is an ID of an imaging device that can be connected to the transmission device 3. Further, a setting of device ID=0000 in FIG. 4 is a default setting and is a setting when format selection is performed in a case in which an imaging device whose device ID is unidentified is used. The user ID is an ID of each user of the imaging display system. A setting of user ID=0000 in FIG. 4 is a default setting of each device and is a setting when the format selection is performed in a case in which the user is not specified.

The imaging data format indicates a format of the highest image quality that can be output by the imaging device. For example, the imaging data format of device ID=ES02 and user ID=D001 is 1212. This imaging data format corresponds to a data format of format number 1212 in FIG 4. Further, a setting of imaging data format=0000 in FIG. 5 is a default setting when the highest image qualify that can be output by the imaging device in use is unidentified. A setting of imaging data format=0000 is a setting in which the format of the input imaging signal is directly used as the imaging data format.

The allowed lowest image quality information indicates lowest image quality that can be set as display image quality. For example, the allowed lowest image quality information of user ID=D001 in device ID=ES02 is 4324. This allowed lowest image quality information corresponds to a data format of format number 4324 in FIG. 4.

The important element information indicates order and a ratio of an element to which importance is attached at the time of format selection. The order cited herein indicates order of the image quality element whose image quality rank is changed at the time of format selection. For example, the order in the important element information of device ID=ES02 and user ID=D001 is 1234. This indicates the order of each image quality element according to the importance degree. For example, 1234 that is the order in this example indicates that importance is attached to the image quality elements in order of the resolution (order 1), the color representation (order 2), the update period (order 3), and the gradation (order 4).

Further, the ratio cited herein indicates by how many ranks a next image quality element is to be changed at a time point at which each image quality element has been changed. For example, a ratio in the important element information of device ID=ES02 and user ID=D001 is 1122. This indicates that the image quality rank of another image quality element is changed at a time point at which any one image quality element is changed by 1 rank. In the example in which device ID=ES02 and user ID=D001, since order=1234 and ratio=1122 in the important element information, the gradation is changed by 2 rank and then the update period is changed by 2 rank. It shows that the color representation is then changed by 1 rank and then the resolution is changed by 1 rank. Thus, the image quality rank of each image quality element is changed in ascending order of the importance degree.

A setting of the user ID other than 0000 is a setting specified for each user. The user can specify the lowest image quality allowed at the time of deterioration of the communication environment or the order of the image quality element to which importance is attached. When the user performs the setting of the allowed lowest image quality information or the important element information, content specified by the user is input to the entire control circuit 17 via the user interface circuit 19. Further, the content specified by the user is stored in the storage circuit 14 by the entire control circuit 17. Further, the entire control circuit 17 is notified of the device ID and the imaging data format from the endoscope 1 via the endoscope control signal 9. Furthermore, the device ID and the imaging data format are stored in the storage circuit 14 by the entire control circuit 17.

In FIG. 5, in the setting of device ID=ES02 and user ID=D001, imaging data format=1212, allowed lowest image quality information=4324, and important element information=(1234),(1122). In this setting, the format of the highest image quality that can be output by the imaging device is resolution=1,920×1,440, color representation=YUV(4,2,2), frame rate=60 Hz and gradation=10 bits, which are indicated by format number 1212.

Further, in this setting, the allowed, lowest display image quality is resolution=800×600, color representation=YUV(4,1,1), frame rate=30 Hz, and gradation=6 bits, which are indicated by format number 4324. Further, this setting attaches importance to the image quality elements in order of the resolution, the color representation, the update period, and the gradation when the formal selection is performed. When the communication environment deteriorates, the image quality rank of the gradation drops by 2 steps and then the image quality rank of the update period drops by 2 steps according to a degree of deterioration. Then, the image quality rank of the color representation drops by 1 step. Then, the image quality rank of the resolution drops 1 step. Then, it is shown that the image quality element is selected and the image quality rank drops in the same procedure.

In the present preferred embodiment, the format selection control information for each combination of the user and the imaging device is used. On the other hand, format selection control information for each user that does not depend on the imaging device or format selection control information for each imaging device that does not depend on the user may be used.

Next, a format selection operation in the present preferred embodiment will be described. The order of the data format selected when the deterioration of the communication environment has progressed and when the communication environment has been recovered is determined by the imaging data format, the allowed lowest image quality information, and the important element information in advance, as described with reference to FIG. 5. Therefore, in the format selection operation, a determination is made as to whether the deterioration of the communication environment has progressed or whether the communication environment has been recovered. In the format selection operation, a data format determined in advance is selected based on a currently selected data format.

Figure 6:
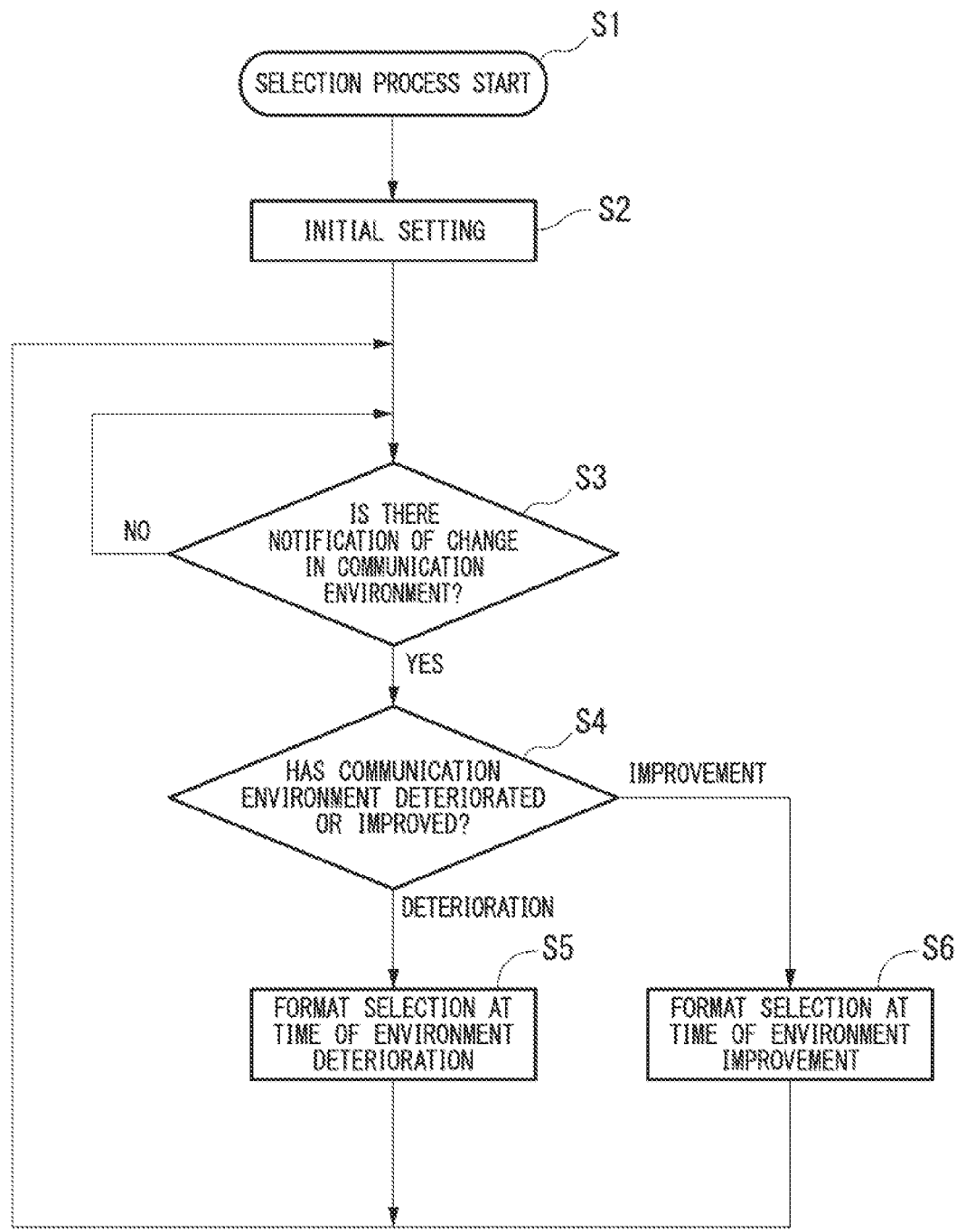
FIG. 6 is a flowchart illustrating a procedure of a format selection operation in accordance with a preferred embodiment of the present invention.

FIG. 6 illustrates a format selection operation in the format determination circuit 15. When a format selection process starts (S1), the format determination circuit 15 performs an initial setting (S2). The initial setting (S2) is an operation of producing the format selection order table.

The format selection order table indicates order of the data format selected by the format determination circuit 15 when a communication environment is changed. FIG. 7 illustrates the format selection order table when device ID=ES02 and user ID=D001. Since imaging data format=1212, allowed lowest image quality information=4324, and important element information=(1234),(1122) when device ID=ES02 and user ID=D001 as shown in FIG. 5, the selection order of the format is the order shown in FIG. 7.

Specifically, when there is no deterioration of the communication environment, a data format of format number=1212 that is the imaging data format is selected. Therefore, the format number of selection order=1 in FIG. 7 is 1212. When the deterioration of the communication environment progresses, the data format is selected according to the important element information. As deterioration of the communication environment progresses, the data format is selected in order of format number=1213, format number=1214, and format number=1224, as shown in FIG. 7.

If the deterioration of the communication environment, further progresses when the data format of format number=1224 is selected, a numerical value of the ratio of the important element information is set to 2 in a state in which the update period (two lower digits of format number=1224) is 2 (30 Hz). Therefore, the data format of format number=1234 is selected as the next data format. However, since the allowed lowest image quality information is 4324, the two lower digits of the format number are not "3" and are maintained as "2." Instead, the color representation that is the image quality element to be changed next drops by 1 step and the data format of format number=1324 is selected as the next data format. Hereinafter, the data format is selected in order of format number=2324, format number=3324, and format number=4324 (allowed lowest image quality), as shown in FIG. 7.

In the initial setting (S2), the format determination circuit 15 produces the format selection order table shown in FIG. 7 according to the format selection control information shown in FIG. 5 and the format table shown in FIG. 4. Further, the format determination circuit 15 is stored in the storage circuit 14. When the initial setting (S2) ends, the communication environment change wait (S3) is performed. The communication environment change wait (S3) is a process of waiting for a change in the communication environment to be notified of by the communication environment detection circuit 16.

When receiving a notification indicating that the communication environment has been changed from the communication environment detection circuit 16, the format determination circuit 15 determines whether the communication environment has deteriorated or has improved (S4). When the communication environment has deteriorated, the format determination circuit 15 performs the format selection process at the time of environment deterioration (S5). When the communication environment has improved, the format determination circuit 15 performs the format selection process at the time of environment improvement (S6).

The format selection process at the time of environment deterioration (S5) is a process of selecting a data format in which a communication data amount decreases. For example, when the communication environment deteriorates in a state of device=ES02 and user=D001, the data format in a direction in which the selection order shown in FIG. 7 is added is selected. Information of the data format selected by the format determination circuit 15 is stored in the storage circuit 14 and is used as a reference data format when the communication environment is changed next.

Hereinafter, a concrete example of the selection of the data format will be described. When the data format of format number=1212 of selection order 1 shown in FIG. 7 has been selected, a data format first selected at the time of the environment deterioration is a data format of format number=1213 of selection order 2. The format of each image quality element in the data format of format number=1213 is resolution=1,920×1,440, color representation=YUV(4,2,2), frame rate=60 Hz and gradation=8 bits.

When the communication environment further deteriorates, a data format of format number=1214 of selection order 3 is selected. The format of each image quality element in the data format of format number=1214 is resolution=1,920×1,440, color representation=YUV(4,2,2), frame rate=60 Hz, and gradation=6 bits. When the communication environment further deteriorates, a data format of format number=1224 of selection order 4 is selected. The format of each image quality element in the data format of format number=1224 is resolution=1,920×1,440, color representation=YUV(4,2,2), frame rate=30 Hz, and gradation=6 bits.

When the data format has been changed from the data format of format number=1212 to the data format of format=1224, the gradation is changed from 10 bits to 6 bits. As a result, the data amount is 30% of an original data amount since the frame rate is changed from 60 Hz to 30 Hz.

Even in this case, for the resolution and the color representation that are the image qualify elements to which the importance is attached by the user, an image is displayed with original image quality maintained.

When the deterioration of the communication environment has progressed and the data format of format number=4324 of selection order 8 corresponding to the allowed lowest image quality has been selected, the communication in the data format continues even when the communication environment further deteriorates.

The formal selection process at the time of environment improvement (S6) is a process of selecting the data format in which a communication data amount increases. For example, when the communication environment has improved in a state of device=ES02 and user=D001, the data format in a direction in which the selection order shown in FIG. 7 is subtracted is selected. Information of the data format selected by the format determination circuit 15 is stored in the storage circuit 14 and is used as a reference data format when the communication environment has been changed next.

For example, when a current data format is a data format of format number=1224 in device=ES02 and user=D001, the selection order is 4. Therefore, in the format selection process at the time of environment improvement (S6), a data format of format number=1214 of selection order 3 is selected.

When the format selection process at the time of environment deterioration (S5) or the format selection process at the time of environment deterioration (S6) ends, the process returns to the communication environment change wait (S3). The format determination circuit 15 waits for a notification of a next change in the communication environment. As described above, since the important element information can be set for each user, an image can be sent with the image quality of the image quality element to which importance is attached by the user maintained to the end.

As described above, according to the present preferred embodiment, when deterioration of the communication environment is detected, the data format having a lower quality than a currently selected data format is selected according to the image quality element to which importance is attached by the user. Accordingly, even when the communication environment has deteriorated, it is possible to suppress deterioration of the image quality element having a high importance degree among the image quality elements of the image displayed on the display device.

Further, an image quality element desired to be held at the time of deterioration of the communication environment can be selected according to a characteristic of the imaging device and preference of the user by using the data format for each imaging device or each combination of the riser and the imaging device. Further, it is possible to set the lowest display image quality even when the communication environment greatly deteriorates, by selecting the data format not less than the image quality indicated by the allowed lowest image quality information. As a result, it is possible to perform a setting so that an image in an unavailable level is not displayed.

According the image processing device in accordance with a preferred embodiment of the present invention, when deterioration of the communication environment is detected, a data format defining a format lower in quality than the format defined in a currently selected data format is selected for an element selected based on the importance degree information. Accordingly, even when the communication environment has deteriorated, it is possible to suppress deterioration of image quality of an element having a high importance degree among elements related to image quality of the image displayed on the display device.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An image processing device comprising:
    an interface circuit receiving frame image data from an imaging device that images a subject and continuously outputs the frame image data;
    a storage circuit storing a plurality of data formats corresponding to different image qualities, the data formats defining a combination of formats of at least two image quality elements among resolution, color representation, update period and gradation that are elements related to image quality of an image displayed on a display monitor, the display monitor continuously performing display processing on the frame image data and displaying the image, the storage circuit being configured to store importance degree information indicating order of the image quality elements according to the importance degree;
    an image processing circuit performing image processing on the frame image data input to the interface circuit according to the data format selected from the data formats stored in the storage circuit;
    a wireless communication circuit transmitting continuously wirelessly the frame image data subjected to the image processing by the image processing circuit to the display monitor;
    a detection circuit detecting a wireless communication environment when the wireless communication circuit wirelessly transmits the frame image data; and
    a format determination circuit selecting one of the data formats stored in the storage circuit, the format determination circuit being configured to select the data format defining a combination of formats of the image quality element including a lower format in quality than a format included in a currently selected data format as for the image quality element selected based on the importance degree information stored in the storage circuit when deterioration of the wireless communication environment is detected by the detection circuit.

2. The image processing device according to claim 1, wherein
    the format determination circuit is configured to select the data format defining a combination of formats of the image quality elements including a lower format in quality than the format included in the currently selected data format as for the image quality element whose importance degree is lower than those of the other image quality elements when deterioration of the wireless communication environment is detected by the detection circuit.

3. The image processing device according to claim 1, wherein
    the data formats are stored in the storage circuit in connection with a user ID for identifying a user, a device ID for identifying an imaging device, or a combination of the user ID and the device ID.

4. The image processing device according to claim 1, wherein
    a plurality of first data formats, and a second data format corresponding to image quality of a highest quality are stored in the storage circuit in connection with a device ID for identifying an imaging device, and
    the format determination circuit is configured to select the first data format defining a combination of formats of the image quality elements including a lower format in quality than or an equal format in quality to a format included in the second data format corresponding to the imaging device identified by the device ID as for the image quality element selected based on the importance degree information stored in the storage circuit when deterioration of the wireless communication environment is detected by the detection circuit, the first data format defining a combination of formats of the image quality elements including a lower format in quality than the format included in the currently selected data format.

5. The image processing device according to claim 1, wherein
    the storage circuit is configured to store a plurality of first data formats, and a second data format defining a combination of formats of the image quality elements corresponding to image quality of available lowest quality of each of the at least two elements, and
    the format determination circuit is configured to select the first data format defining a combination of formats of the image quality elements including a higher format in quality than or an equal format in quality to a format included in the second data format as for the image quality element selected based on the importance degree information stored in the storage circuit when deterioration of the wireless communication environment is detected by the detection circuit, the first data format defining a combination of formats of the image quality elements including a lower format in quality than the format included in the currently selected data format.

6. The image processing device according to claim 5, wherein
    the second data format is stored in the storage circuit in connection with a user ID for identifying a user, a device ID for identifying an imaging device, or a combination of the user ID and the device ID.

* * * * *